Dec. 31, 1946.  E. I. STEARNS, JR  2,413,660
FLICKERING BEAM SPECTROPHOTOMETER
Filed June 1, 1944
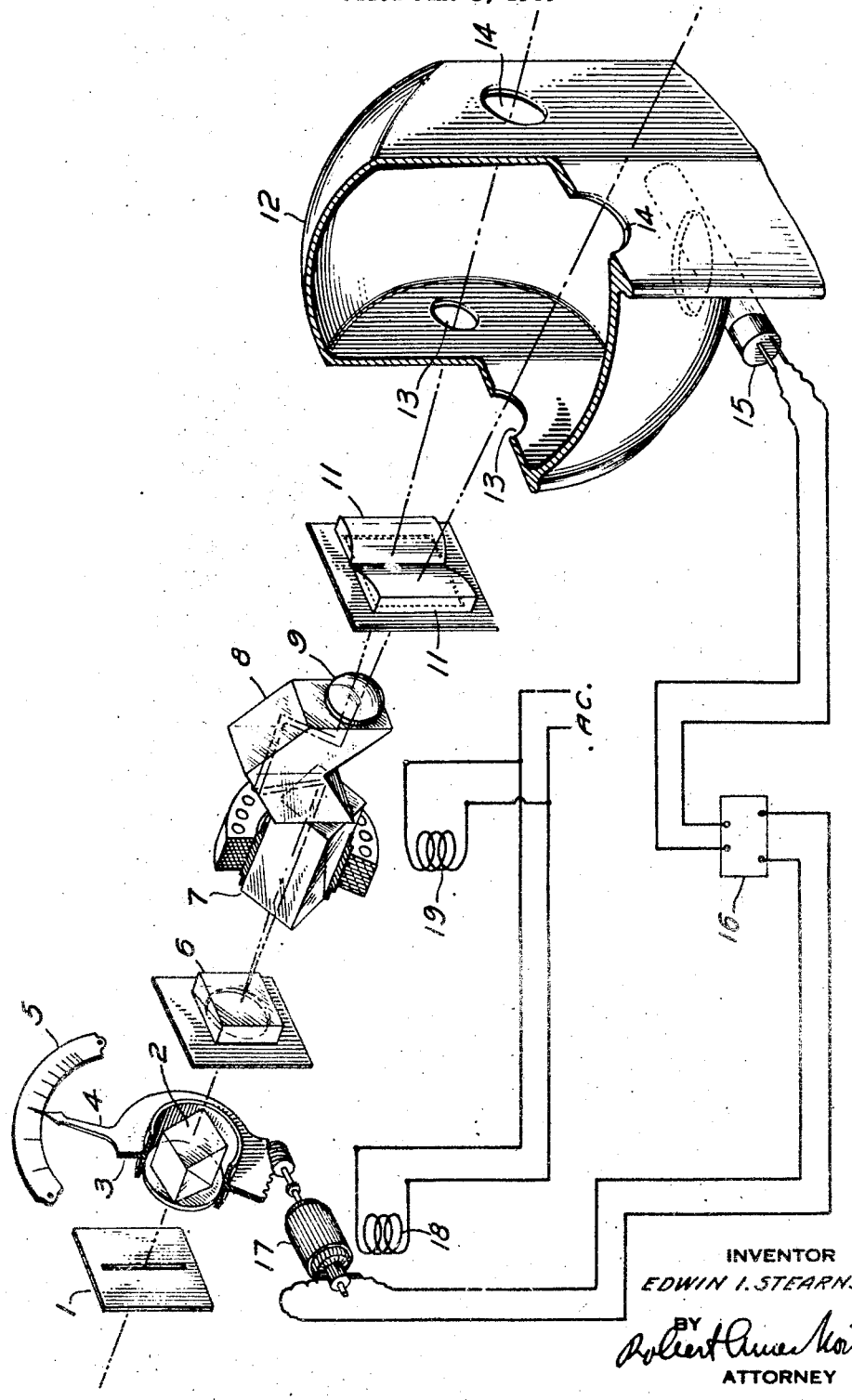
INVENTOR
EDWIN I. STEARNS, JR.
BY
ATTORNEY Patented Dec. 31, 1946

2,413,660

UNITED STATES PATENT OFFICE 2,413,660

FLICKERING BEAM SPECTROPHOTOMETER

Edwin I. Stearns, Jr., North Plainfield, N. J., assignor to American Cyanamid Company, New York, N. Y., a corporation of Maine Application June 1, 1944, Serial No. 538,308

3 Claims. (Cl. 88—14)

This invention relates to an improved spectrophotometer of the polarized flickering beam type.

The first successful commercial machine of this type is described and claimed in the patent to Orrin Weston Pineo, No. 2,107,836, February 8, 1938. In this spectrophotometer, light from a Van Cittert double monochromator passes through a photometering Rochon prism, then through a Wollaston prism and finally through a Rochon prism which is rotated at an accurately predetermined rate by means of a synchronous motor. The two beams from the Wollaston prism which are polarized at right angles to each other after passing through the rotating Rochon strike samples and standards of either reflectance or transmission and the total light from the two beams is integrated in an integrating sphere and the integrated light impressed on a phototube which is in the input circuit of a very high gain audio frequency amplifier. The amplified output is then impressed on the armature of a motor, the field of which is supplied with the same current used in driving the synchronous motor and in turn drives the photometering Rochon prism in a direction which will result in a change in intensity of the flickering beams to cause the light from each beam in the integrating sphere to be equal, at which time there is present in the integrating sphere no light fluctuations at flicker frequency and hence no amplified signal at flicker frequency. The photometering motor may drive an indicating device or an automatic recorder of known design.

The polarized flickering beam spectrophotometer has achieved great success because in its most elaborate modifications curves of photometric absorption or reflectance can be automatically drawn in a very short time. Great as is the advance represented by the polarized flickering beam spectrophotometer over early instruments, in its original form the device had some disadvantages. By that method, the light incident on the specimen is varying its plane of polarization, so that in many cases an unknown factor of variation is introduced which may vitiate the results. Further, spurious signals of the fundamental and harmonic frequencies are produced in the photocell circuit which obscure the vanishing signal at balance and so result in loss of sensitivity in detecting the balance point.

In the patent to O. W. Pineo, No. 2,126,410, August 9, 1938, there are described a number of different flickering means which when followed by a stationary polarizer, such as, for example, a Rochon prism, produced reliable flickering with beams which maintain a constant plane of polarization instead of a plane which rotated with rotation of the flicker prism as in the early Pineo patent referred to above. In the improved instrument which is described in the two Pineo patents the reduced sensitivity with polarizing samples is completely overcome and for the first time it becomes possible to obtain reliable and accurate spectrophotometric measurements of polarizing samples. The great advance in sensitivity and accuracy with polarizing samples, however, was obtained only if the orientation of the sample was constant and hence the azimuth of polarization did not change. Conflicting results were obtained if the same sample was measured at different azimuths.

In the patent to O. W. Pineo, No. 2,189,270, February 6, 1940, there is described an improvement on the instrument using a stationary plane of polarization in which the final Rochon prism is followed either by a quarter wave plate or a Fresnel rhomb. Both of these devices transform plane polarized light into circularly polarized light which is not sensitive to change in azimuth of the sample. The improvement described in the last mentioned Pineo patent, while of definite practical value, was not a complete solution of the azimuth problem because unfortunately a quarter wave plate gives a retardation of exactly a quarter of a wave length at only one frequency of light. Lights of other frequencies within the visible spectrum are not circularly polarized but are elliptically polarized with ellipses of increasing eccentricity as the frequency of the light varies from that at which the quarter wave plate gives a true retardation of a quarter of a wave length. The elliptically polarized light at other frequencies materially reduces the azimuth effect over plane polarized light but is still not perfect.

The Fresnel rhomb is less sharply selective with respect to wave length and from this standpoint gives a greater degree of azimuth correction. However, as described in the patent it requires an offset in the light path and presents some mechanical disadvantages as compared to a quarter wave plate.

According to the present invention a flickering beam spectrophotometer using Rochon flickering is provided with a Fresnel rhomb rotating with the Rochon prism. I have found that this device not only decreases the azimuth effect as it does in the half wave flickering beam spectrophotometer described and claimed in the Pineo Patent No. 2,189,270 referred to above, but it also removes the disadvantage of low sensitivity to polarizing samples which was the most serious drawback of the type of instrument using Rochon flickering. When a Fresnel rhomb is associated with a Rochon flicker prism an instrument is obtained in which azimuth effect is decreased to precisely the same degree as in a half wave flicker instrument and in addition the tremendous range and lack of critical phase control of Rochon flickering are obtained with a sensitivity, only little, if any, inferior to a half wave plate device. In other words, the application of a Fresnel rhomb to an instrument using Rochon flickering transforms this instrument which was formerly inferior to a half wave plate instrument into one which is better than a half wave plate instrument using the same Fresnel rhomb.

The application of a Fresnel rhomb to a Rochon flickering prism presents a problem. An ordinary Fresnel rhomb displaces the beam of light laterally and, of course, such a device could not be applied to a rotating Rochon prism because the emergent beams would revolve around the circumference of a circle the radius of which is the offset caused by the rhomb. This would require reflecting mirrors to redirect the beams and would result in a device too heavy for convenient rotation at flicker frequency. Such an arrangement while completely operative optically leaves much to be desired in practical machine design. However, I have found that the great advantages which a Fresnel rhomb presents over a quarter wave plate, namely, markedly reduced change of retardation with wave length, may be obtained in a device which does not offset the light beam. An ordinary Fresnel rhomb employs two internal reflections to effect the retardation to produce circularly polarized light. With wave lengths about the middle of the visible spectrum the angles are between 51° and 52°. However, I have found that if a Fresnel rhomb is constructed in two parts with four internal reflections at about 41° each of the four reflections will cause the same retardation but the apparatus will constitute a symmetrical device in which the emergent beams will be parallel to the beams entering the rhomb. The device might be considered as a double rhomb with smaller reflection angles. Such a device is comparatively compact and can be incorporated with a rotating Rochon prism without serious mechanical problems and without placing an undue load on the flicker motor.

As the present invention deals with improvements in the optics of the instrument between the flicker prism and the sample and standard it is applicable to a modified form of polarizing flickering beam spectrophotometer using recombined images instead of an integrating sphere. This type of instrument, which is suitable mainly for transmission samples, may be improved by the present invention just as are the more versatile instruments which employ integrating spheres.

The invention will be described in greater detail in conjunction with the drawing which represents a perspective view of a spectrophotometer using a double Fresnel rhomb.

In the modification shown in the drawing light from the slit 1 of a monochromator (not shown) passes through a photometering Rochon prism 2 mounted in a sleeve 3 carrying a pointer 4 which moves over a scale 5. The plane polarized light emerging from the photometering prism then passes through a Wollaston prism 6 which splits the beam into two diverging beams plane polarized at right angles to each other.

The two beams pass through a Rochon prism 7 rotated by a synchronous motor at one half flicker frequency. On the rear face of the prism there is mounted a double Fresnel rhomb 8 having the rhomb axis turned 45° with respect to the prism axis. The double rhomb provides four internal reflections at angles of about 41°, resulting in retardation for the middle of the visible spectrum to produce circularly polarized light. The emergent beams pass through a lens 9 and then through decentering lenses 11 which increase the angles of deviation. The beams then enter the integrating sphere 12 through the windows 13 aligned with the reflectance sample and standard windows 14 in the conventional manner. Integrated light is applied to the phototube 15 and there is no light variation at flicker frequency if the two beams are of equal intensity after reflection from sample and standard. Any changes in reflection of the sample will make one or the other of the beams stronger and there will be a pulsation of light at flicker frequency in phase with the stronger beam.

This light pulsation is transformed in the phototube 15 into a flicker frequency signal which is amplified by the high gain audio frequency amplifier 16, the amplified output being applied to motor 17 rotating the photometering prism 2 through suitable gearing. The field 18 of this motor and field 19 of the flicker motor are both fed from the same source of alternating current at flicker frequency. The phase is such that the rotation of the motor 17 is in a direction to restore balance of light in the integrating sphere. The amount by which the photometering prism is turned is measured on the scale 5 by the pointer 4 and is a measure of the change of reflectance of the sample. The motor 17 may also drive a recorder of conventional design where a recording instrument is desired.

In the center of the visible spectrum the Fresnel rhomb transforms both beams of light into circularly polarized light which, of course, has no orientation and therefore is reflected from a polarizing sample in the same manner regardless of the azimuth of the sample. In other words, for this wave length azimuth effect is completely eliminated and sensitivity of the instrument is as high as with a half wave plate flickering instrument. In other parts of the spectrum the beams will be elliptically polarized with varying degrees of eccentricity, the variation from circular polarization being relatively small because the Fresnel rhomb does not change its retardation very rapidly with wave length. In other parts of the spectrum, therefore, there will be some azimuth effect, but it will be greatly reduced and the sensitivity in measurement of polarizing samples, while not quite as high as with the half wave plate flickering instrument, is very much greater than in an ordinary Rochon flickering instrument. The great range of Rochon flickering and the lack of critical phase control are not adversely affected by the use of the double Fresnel rhomb.

The advantages of the invention are not limited to instruments operating on light in the visible spectrum although these instruments represent the largest field of photometric apparatus. Elimination of the azimuth effect by means of the present invention is just as important with machines using ultraviolet light or infrared so long as the light still becomes polarized. For this reason the term "light" will be used in broader sense to include ultraviolet and infrared. Similarly where reference is made to illumination it is not intended to limit the term to light in the visible spectrum.

When infrared or ultraviolet light is used suitable sources must be employed and also suitable receptors. In the former case for the near infrared they may be phototubes as shown.

I claim:

1. In a photometric apparatus comprising a photoelectric device arranged to receive integrated light from a sample and a standard, an optical system arranged to control the light received by said device comprising in series an angularly movable polarizing member, a second member having the property of dividing a light beam into two beams which are polarized respectively in planes at right angles to each other, an uniformly rotatable element capable of plane polarizing light between the second member and the sample and standard, means for rotating this member to cause each beam to flicker between minimum and maximum intensities, the variations of the two beams being in opposite phase, electric driving means for the first member responsive to alternating current of a predetermined frequency, means for uniformly rotating the beam flickering member at such a speed as to cause the beams to flicker at the same frequency to which the driving means of the first member is responsive, the photoelectric device being coupled to an amplifier capable of amplifying alternating current fluctuations produced by the device in response to fluctuations of light impinging thereon at flicker frequency, means for feeding the alternating current component of the amplifier output to the electric driving means for the first polarizing member, the amplifier circuits and electric driving means being so adjusted as to cause the polarizing member to rotate in a direction to produce the same total light from the sample and standard, the improvement which comprises a retardation device mounted for rotation with said uniformly rotatable member said device comprising a block of transparent material in the form of a V-shaped double rhomb with parallel and aligned entrance and exit surfaces positioned on and normal to the axis of symmetry of the two beams, the reflection angles of the four internal reflecting surfaces being sufficiently close to 41° so that plane polarized light at one wave length in the spectrum to be measured emerges after four internal reflections circularly polarized whereby the beam striking the sample and standard are transformed into circularly or elliptically polarized light.

2. In a photometric apparatus comprising a photoelectric device arranged to receive integrated light from a sample and a standard, an optical system arranged to control the light received by said device comprising in series an angularly movable polarizing member, a second member having the property of dividing a light beam into two beams which are polarized respectively in planes at right angles to each other, an uniformly rotatable element capable of plane polarizing light between the second member and the sample and standard, means for rotating this member to cause each beam to flicker between minimum and maximum intensities, the variations of the two beams being in opposite phase, means by which the first polarizing member may be angularly adjusted in accordance with the output of the photoelectric device and means for passing to the first polarizing member a beam of substantially monochromatic light, said means being further capable of varying the wave length of said monochromatic light from one end of the spectrum to the other, the improvement which comprises a retardation device rotating with said uniformly rotatable member said device comprising a block of transparent material in the form of a V-shaped double rhomb with parallel and aligned entrance and exit surfaces positioned on and normal to the axis of symmetry of the two beams, the reflection angles of the four internal reflecting surfaces being sufficiently close to 41° so that plane polarized light at one wave length in the spectrum to be measured emerges after four internal reflections circularly polarized whereby the beams striking the sample and standard are transformed into circularly or elliptically polarized light.

3. In a photometric apparatus comprising a photoelectric device arranged to receive integrated light from a sample and a standard, an optical system arranged to control the light received by said device comprising in series an angularly movable polarizing member, a second member having the property of dividing a light beam into two beams which are polarized respectively in planes at right angles to each other, an uniformly rotatable element capable of plane polarizing light between the second member and the sample and standard, means for rotating this member to cause each beam to flicker between minimum and maximum intensities, the variations of the two beams being in opposite phase, electric driving means for the first member responsive to alternating current of a predetermined frequency, means for uniformly rotating the beam flickering member at such a speed as to cause the beams to flicker at the same frequency to which the driving means at the first member is responsive, the photoelectric device being coupled to an amplifier capable of amplifying alternating current fluctuations produced by the device in response to fluctuations of light impinging thereon at flicker frequency, means for feeding the alternating current component of the amplifier output to the electric driving means for the first polarizing member, the amplifier circuits and electric driving means being so adjusted as to cause the polarizing member to rotate in a direction to produce the same total light from the sample and standard and means for passing to the first polarizing member a beam of substantially monochromatic light, said means being further capable of varying the wave length of said monochromatic light from one end of the spectrum to the other, the improvement which comprises a retardation device rotating with said uniformly rotatable member said device comprising a block of transparent material in the form of a V-shaped double rhomb with parallel and aligned entrance and exit surfaces positioned on and normal to the axis of symmetry of the two beams, the reflection angles of the four internal reflecting surfaces being sufficiently close to 41° so that plane polarized light at one wave length in the spectrum to be measured emerges after four internal reflections circularly polarized whereby the beams striking the sample and standard are transformed into circularly or elliptically polarized light.

EDWIN I. STEARNS, Jr.